United States Patent
Rivers, Jr. et al.

(10) Patent No.: US 8,472,154 B2
(45) Date of Patent: Jun. 25, 2013

(54) SYSTEMS, METHODS, AND APPARATUS FOR LEAKAGE CURRENT MASKING AND GROUND FAULT DETECTION

(75) Inventors: Cecil Rivers, Jr., West Hartford, CT (US); Thomas Frederick Papallo, Jr., Farmington, CT (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 12/962,803

(22) Filed: Dec. 8, 2010

(65) Prior Publication Data

US 2012/0147507 A1    Jun. 14, 2012

(51) Int. Cl.
*H01H 83/04*   (2006.01)

(52) U.S. Cl.
USPC ............... 361/42; 361/43; 361/30; 361/93.1; 361/44; 361/45

(58) Field of Classification Search
USPC ............................. 361/42, 43, 44, 45, 93.1
See application file for complete search history.

(56) References Cited

U.S. PATENT DOCUMENTS

| | | | |
|---|---|---|---|
| 3,801,871 A | 4/1974 | Loh | |
| 4,725,913 A | 2/1988 | Dhar | |
| 5,459,630 A | 10/1995 | MacKenzie et al. | |
| 5,969,921 A | 10/1999 | Wafer et al. | |
| 6,717,786 B2 | 4/2004 | Holley et al. | |
| 7,362,551 B2 | 4/2008 | Bax et al. | |
| 8,064,178 B2 * | 11/2011 | Markyvech | 361/57 |
| 2008/0123226 A1 * | 5/2008 | McGinn et al. | 361/42 |
| 2009/0323239 A1 * | 12/2009 | Markyvech | 361/57 |

* cited by examiner

*Primary Examiner* — Rexford Barnie
*Assistant Examiner* — Haihui Zhang
(74) *Attorney, Agent, or Firm* — Global Patent Operation

(57) ABSTRACT

A leakage current masking device for use with a circuit includes at least one inductive load device coupled to the circuit and configured to supply an inductive load to the circuit, and a processor communicatively coupled to the inductive load device. The processor is configured to receive a signal representative of a current through the circuit, calculate a capacitive leakage current component of the current, and cause the inductive load device to adjust the inductive load supplied to the circuit to reduce the capacitive leakage current component.

20 Claims, 3 Drawing Sheets

US 8,472,154 B2

SYSTEMS, METHODS, AND APPARATUS FOR LEAKAGE CURRENT MASKING AND GROUND FAULT DETECTION

BACKGROUND OF THE INVENTION

The embodiments described herein relate generally to circuit fault detection and, more particularly, to detecting a ground fault in a circuit.

In a conventional electrical system, analysis of sinusoidal AC current and voltage performance is simplified by using a phasor characterization of the sinusoids. Such phasor characterizations generally use complex numbers having "real" components associated with resistive elements and "imaginary" components associated with reactive elements. For example, a phasor characterization of a ground fault current in a circuit includes a reactive, imaginary current component that flows through the capacitive elements of the electrical system, and a resistive, real current component. The reactive current component is purely reactive and neither causes heating nor presents a shock hazard. Therefore, the reactive current component of the ground fault current does not necessitate tripping of a protective device. In contrast, the resistive component can cause heating and present a shock hazard. Accordingly, only the resistive of the ground fault current necessitates tripping of the protective device.

At least some known systems and devices for use in charging an electric device, such as an electric vehicle or hybrid-electric vehicle, are incapable of discriminating between capacitive-generated leakage current and resistive ground current. Accordingly, at least some known systems and devices are susceptible to nuisance tripping, which interrupts current flow to the electric device. For example, a charging system or device generally connects to a power distribution network through a household wall power outlet, such as an outlet that is provided in a garage or carport. Most fire codes and regulations require these outlets to include a ground fault circuit interrupt (GFCI) breaker or to use a self-contained ground fault interrupt wall outlet that detects resistive current. However, many electric vehicle on-board battery chargers generate a high leakage current that can cause a GFCI device, such as a GFCI breaker or a GFI wall outlet, to trip due to a capacitive current and when a true resistive ground fault is not actually present. At least some GFCI devices can be made to nuisance trip by a capacitive current to ground in the absence of a real, or resistive, ground fault condition. For example, the capacitive current can exceed a predetermined current threshold of at least some known GFCI devices and result in a nuisance trip of the GFCI device.

BRIEF DESCRIPTION OF THE INVENTION

In one aspect, a leakage current masking device is provided for use with a circuit. The leakage current masking device includes at least one inductive load device coupled to the circuit and configured to supply an inductive load to the circuit, and a processor communicatively coupled to the inductive load device. The processor is configured to receive a signal representative of a current through the circuit, calculate a capacitive leakage current component of the current, and cause the inductive load device to adjust the inductive load supplied to the circuit to reduce the capacitive leakage current component.

In another aspect, a charging system includes a ground fault circuit interrupter (GFCI) configured to detect a resistive ground fault in a circuit that couples a source and a load, and a leakage current masking device electrically coupled to the GFCI. The leakage current masking device includes at least one inductive load device coupled to the circuit and configured to supply an inductive load to the circuit, and a processor communicatively coupled to the inductive load device. The processor is configured to receive a signal representative of a current through the circuit, calculate a capacitive leakage current component of the current, and cause the inductive load device to adjust the inductive load supplied to the circuit to reduce the capacitive leakage current component.

In another aspect, a method is provided for detecting a resistive ground fault in a circuit. The method includes receiving at a processor a signal representative of a current through the circuit, and calculating a capacitive leakage current component and a ground fault current component of the current. The method also includes causing at least one inductive load device to adjust an inductive load supplied to the circuit to reduce the capacitive leakage current component, and detecting a resistive ground fault in the circuit based on the ground fault current component.

DETAILED DESCRIPTION OF THE INVENTION

Exemplary embodiments of systems, methods, and apparatus for use in masking a leakage current, such as a capacitive leakage current, and/or detecting a ground fault are described herein. These embodiments facilitate discriminating between capacitive-generated leakage current and resistive ground faults, thereby reducing nuisance tripping of circuit interruption devices, such as ground fault circuit interrupters.

The term "electric device" refers generally to any device that is capable of receiving power from an electrical outlet and storing at least a portion of that power in a battery or other electrical power storage device. Exemplary electric devices may include, but are not limited to only including, electrical vehicles and electric-hybrid vehicles. The above examples are exemplary only, and thus are not intended to limit in any way the definition and/or meaning of the term "electric device."

Figure 1:
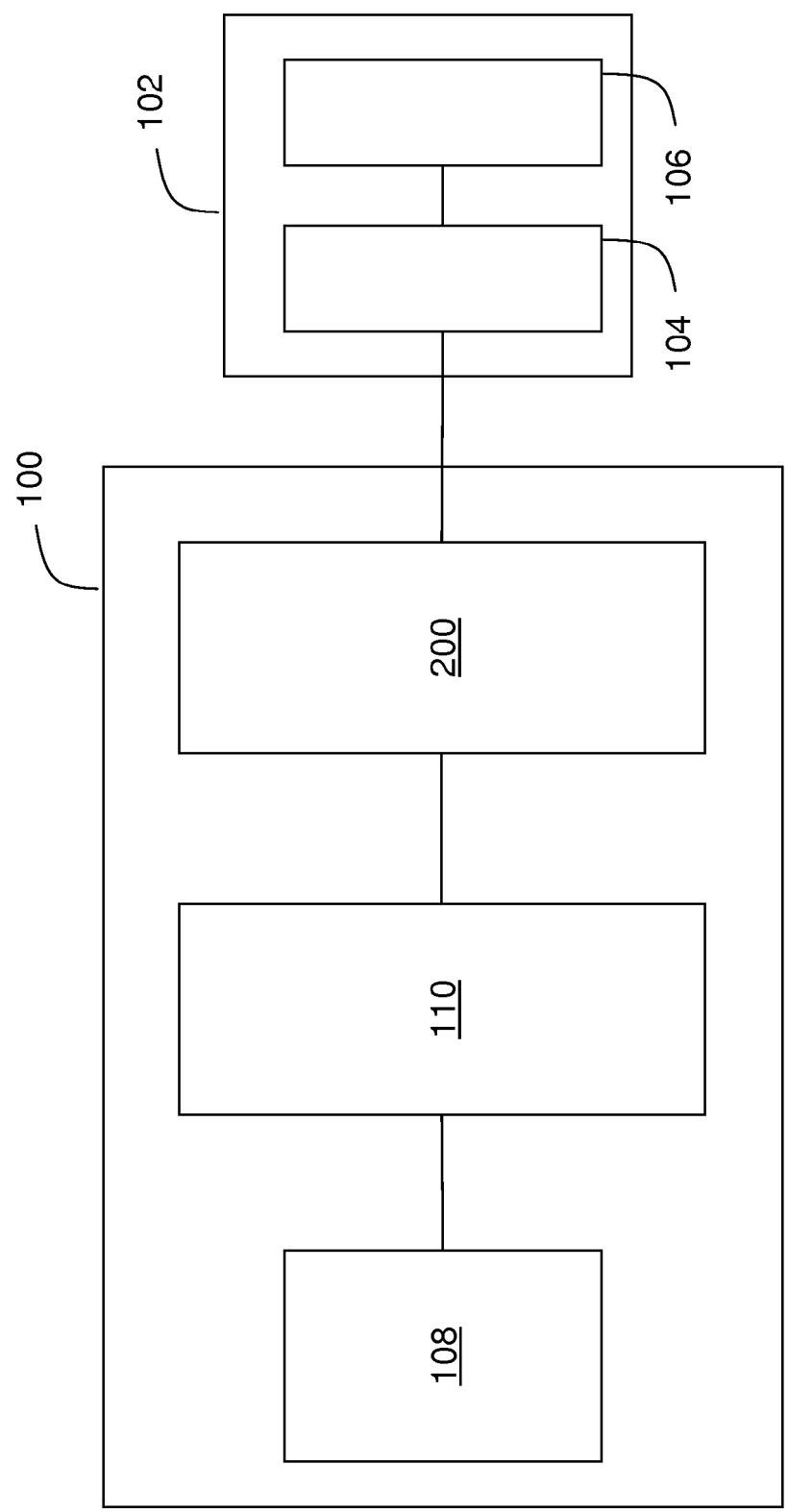
FIG. 1 is a schematic block diagram of an exemplary charging system.

FIG. 1 is a schematic block diagram of an exemplary charging system 100 for use in charging an electric device 102. In an exemplary embodiment, electric device 102 includes a charging device 104 and one or more batteries 106 that are electrically coupled to charging device 104. As described herein, electric device 102, charging device 104, and/or battery 106 may be referred to as a load.

In an exemplary embodiment, charging system 100 includes a power source 108, a ground fault circuit interrupter (GFCI) 110, and a leakage current masking device 200. Masking device 200 is configured to be removably coupled between GFCI 110 and charging device 104. In an alternative embodiment, masking device 200 is a component of electric device 102. For example, masking device 200 may be a component of charging device 104 or may be electrically coupled to charging device 104.

Moreover, in an exemplary embodiment, masking device 200 adjusts an inductive load on a circuit or a portion of a circuit, such as a line conductor, until a capacitive leakage current flowing to ground is less than a predetermined threshold value or is approximately cancelled. The threshold value can be any desired value. For example, in some applications the threshold value may be approximately five milliamps and, thus, the threshold value for capacitive leakage current should be lower. Preferably, masking device 200 adjusts the inductive load until the capacitive leakage current is as close to zero as possible. Once the inductive load is added to the circuit to reduce the capacitive leakage current, the circuit can be monitored for a resistive ground fault by GFCI 110. Reducing or cancelling the capacitive leakage current and measuring only a resistive current facilitates reducing nuisance trips of GFCI 110.

Figure 2:
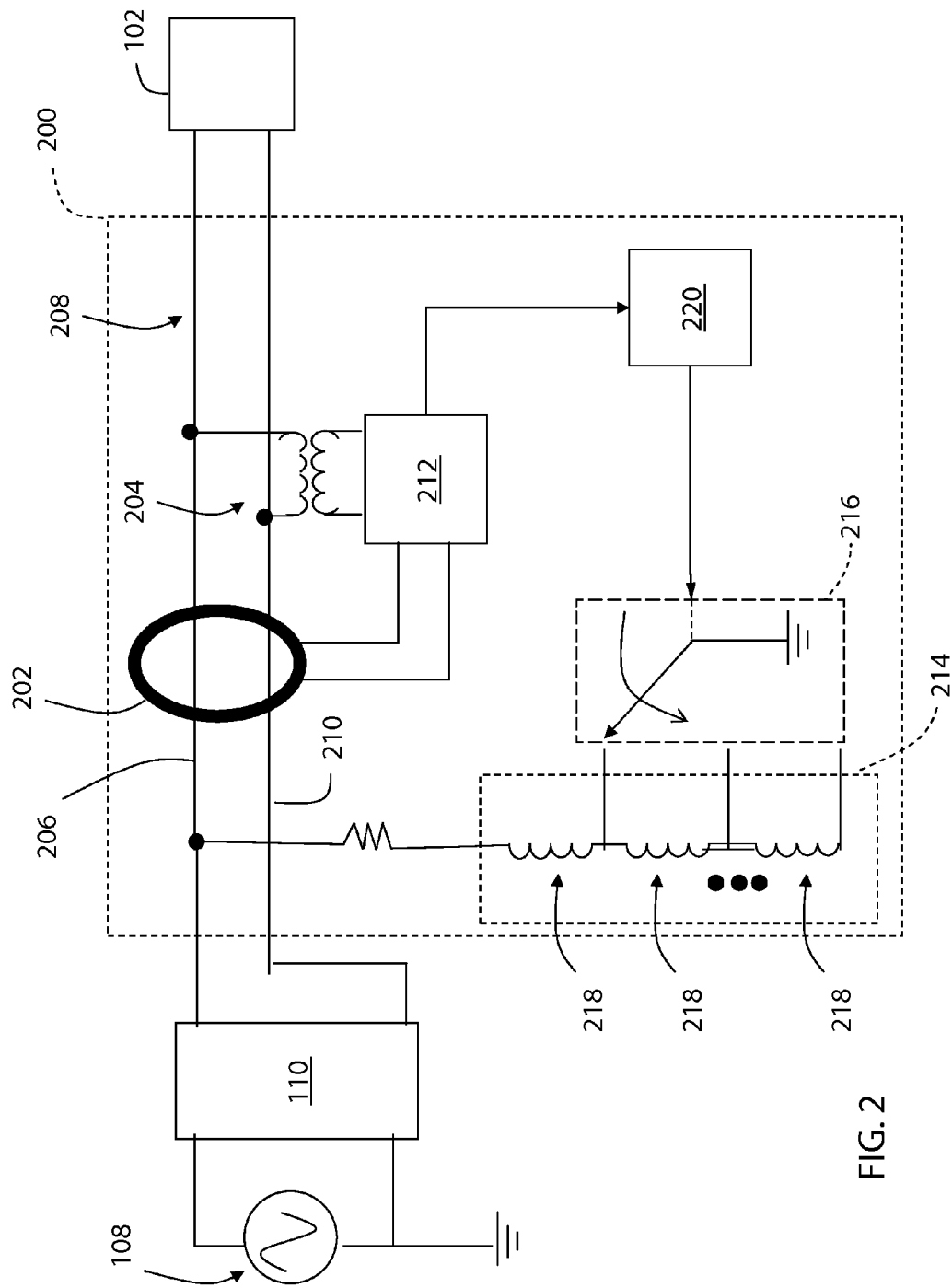
FIG. 2 is a schematic block diagram of an exemplary leakage current masking device that may be used with the charging system shown in FIG. 1.

FIG. 2 is a schematic block diagram of leakage current masking device 200. In an exemplary embodiment, masking device 200 includes one or more current sensors 202 and one or more voltage sensors 204. Current sensor 202 measures a current, such as a residual current or a differential current, between GFCI 110 and the load. For example, current sensor 202 may measure the current through a phase or line conductor 206 of a circuit 208. In an alternative embodiment, current sensor 202 measures a first current through line conductor 206 and a second current through a neutral conductor 210 of circuit 208. The residual current can then be calculated as a difference between the first current and the second current. In another alternative embodiment, and when circuit 208 includes two line conductors 206, current sensor 202 measures a first current through a first line conductor, a second current through a second line conductor, and a third current through a neutral conductor 210. The residual current can then be calculated as a sum of the first and second currents, the second and third currents, or the first and third currents. In an exemplary embodiment, current sensor 202 is a current transformer. However, any suitable current sensor may be used that enables measurement of the current through circuit 208. Once the current is measured, current sensor 202 transmits a signal representative of the measured current. In an exemplary embodiment, voltage sensor 204 measures a voltage between conductors of circuit 208. For example, voltage sensor 204 may measure a voltage across line conductor 206 and neutral conductor 210. In an alternative embodiment, voltage sensor 204 measures a voltage across two line conductors 206. Once the voltage is measured, voltage sensor 204 generates a signal representative of the measured voltage.

In an exemplary embodiment, masking device 200 also includes a signal conditioning unit 212 that is communicatively coupled to current sensor 202 and/or voltage sensor 204. Signal conditioning unit 212 includes electrical components for use in, for example and not by way of limitation, filtering, amplifying, and/or converting the current and/or voltage signals. In an exemplary embodiment, signal conditioning unit 212 includes analog-to-digital (A/D) converters (not shown) that convert an analog signal, such as the current signal and/or the voltage signal, to a digital signal using an A/D conversion operation.

Moreover, masking device 200 includes an inductive load device 214 and a selector 216 that is operatively coupled to inductive load device 214. In an exemplary embodiment, inductive load device 214 includes an inductor with a plurality of taps 218 that enable adjustment of the inductance of the inductor. Selector 216 is a switch that selectively couples to a tap 218 of the inductor to adjust the amount of inductive load on circuit 208. In an alternative embodiment in which circuit 208 includes two line conductors 206 and neutral conductor, masking device 200 includes multiple inductive load devices 214. In such an embodiment, each inductive load device 214 provides an inductive load to a respective line conductor 206.

Furthermore, masking device 200 includes a processor 220 that is communicatively coupled to signal conditioning unit 212. The term "processor" refers generally to any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term "processor." In an exemplary embodiment, processor 220 receives the current signal and/or the voltage signal from current sensor 202 and/or voltage sensor 204, respectively. Specifically, processor 220 receives a digitized current signal and/or a digitized voltage signal from signal conditioning unit 212. Processor 220 then determines a real portion of the current signal and an imaginary portion of the current signal. In an exemplary embodiment, the real portion of the current signal represents a resistive ground fault current component and the imaginary portion represents a capacitive leakage current component. It should be understood that, for a given circuit having a ground fault current $I_{gf}$, the current $I_{gf}$ can be determined using a ratio of the real portion of the product of the residual current $I_r$, which is the sum of a phase current and a neutral current, and a complex conjugate of phase to neutral voltage V. This is expressed in Equation (1) below:

$$I_{gf} = \frac{\text{Re}\{(I_r) \times (V)\}}{|V|} \quad \text{Eq. (1)}$$

Moreover, when calculating the real and imaginary portions of the residual current, processor 220 produces a phasor representation of the line voltage by multiplying the measured line voltage by a first and a second predetermined sinusoidal waveform. The first predetermined sinusoidal waveform is used to generate a real portion of the line voltage, and the second predetermined sinusoidal waveform is used to generate an imaginary portion of the line voltage. In some embodiments, the first and second sinusoidal waveforms are selected to match a frequency of the voltage of the circuit. In an exemplary embodiment, processor 220 then produces a phasor representation of the residual current by multiplying the measured or calculated residual current by a third and a fourth predetermined sinusoidal waveform. The third predetermined sinusoidal waveform is used to generate the real portion of the residual current (i.e., the ground fault current), and the fourth predetermined sinusoidal waveform is used to generate the imaginary portion of the residual current (i.e., the capacitive leakage current). In some embodiments, the third and fourth sinusoidal waveforms are selected to match a frequency of the current of the circuit.

Based on the magnitude of the capacitive leakage current, processor 220 determines whether an additional inductive load is necessary on circuit 208. Processor 220 determines an amount of inductive load to be added and causes selector 216 to adjust the inductive load on circuit 208 using inductive load device 214. For example, processor 220 calculates a capacitance C using the capacitive leakage current $I_c$, the line voltage V, and a system frequency f. This calculation is illustrated by Equation (2) below:

$$C = \frac{I_c}{V * 2\pi * f} \qquad \text{Eq. (2)}$$

Processor 220 compares the capacitive leakage current to a threshold value. If the capacitive leakage current is greater than the threshold value, processor 220 transmits a command signal to selector 216 to facilitate reducing the capacitive leakage current flowing to ground is less than the threshold value or is approximately cancelled. In response to the signal, selector 216 controls inductive load device 214 to adjust the inductive load on circuit 208, such as by increasing the inductive load. In an exemplary embodiment, the inductive load is based on the capacitance C of circuit 208 and the resonant frequency $f_r$ of circuit 208. The resonant frequency $f_r$ of circuit 208 is calculated by processor 220 using Equation (3) as shown below:

$$f_r = \frac{1}{2\pi\sqrt{LC}} \qquad \text{Eq. (3)}$$

After the capacitive leakage current is appropriately reduced, processor 220 calculates a magnitude of the line voltage phasor, and generates a complex conjugate of the line voltage phasor by determining a negative of the imaginary portion of the line voltage. The residual current phasor is then multiplied by the conjugate voltage phasor to generate a phasor representation of the ground fault current. The ground fault current phasor is calculated by dividing a magnitude of the line voltage phasor to obtain the real portion of the ground fault current. The Processor 220 then transmits the real portion of the ground fault current to GFCI 110.

GFCI 110 then determines if a true ground fault condition is present in circuit 208. For example, GFCI 110 compares the real portion of the ground fault current to a threshold value or predetermined level of ground fault current. If the real portion of the ground fault current is greater than the threshold value or predetermined level of ground fault current, then a true ground fault is determined to exist. In response to such a determination, GFCI 110 initiates opening circuit 208 by, for example, tripping a circuit breaker to remove the ground fault detection.

Figure 3:
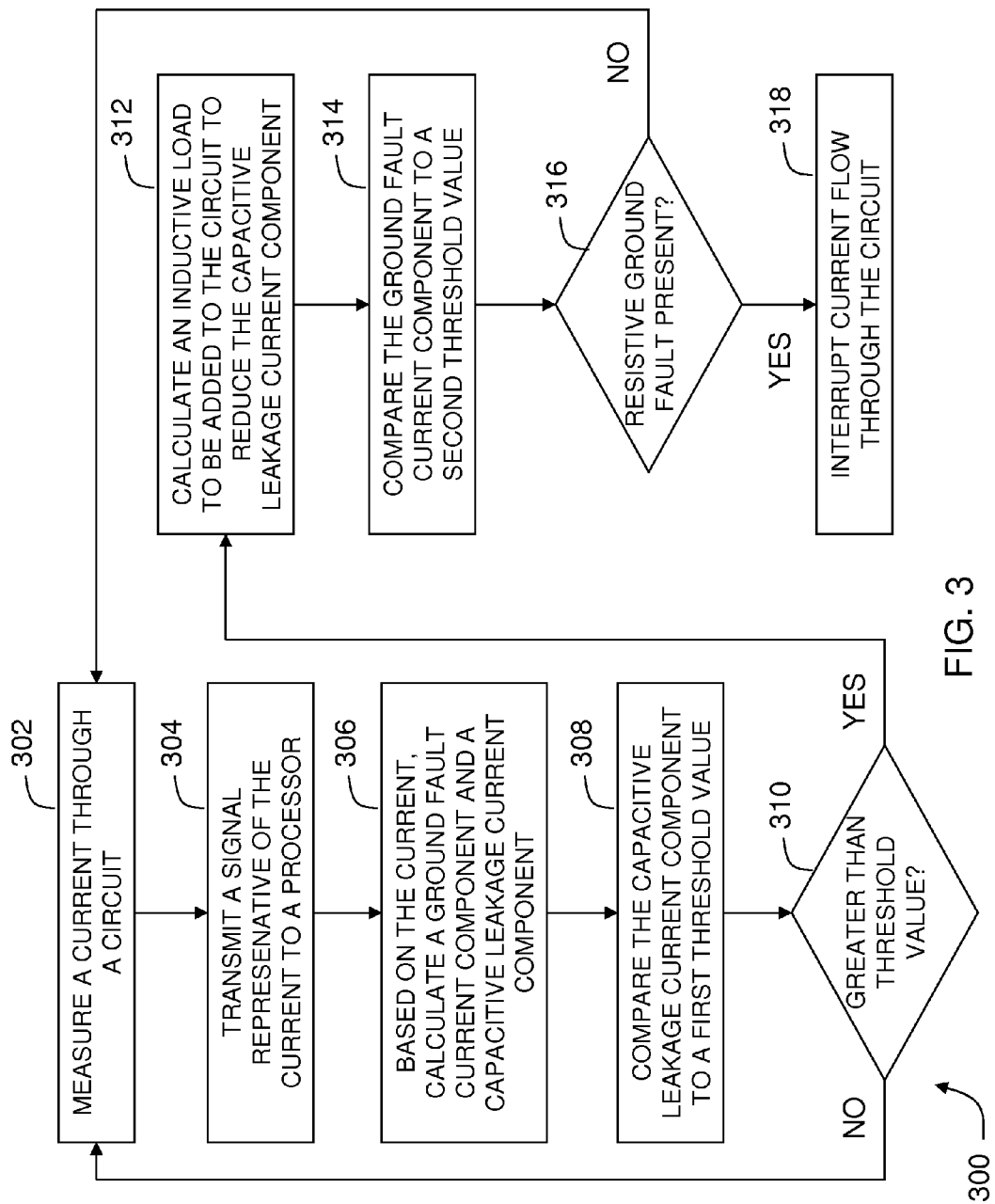
FIG. 3 is a flowchart illustrating an exemplary method for detecting a resistive ground fault in a circuit using the charging system shown in FIG. 1.

FIG. 3 is a flowchart 300 that illustrates an exemplary method for detecting a resistive ground fault in a circuit, such as circuit 208 (shown in FIG. 2). In an exemplary embodiment, current sensor 202 (shown in FIG. 2) measures 302 a current, such as a residual current, through a conductor of circuit 208. In some embodiments, current sensor 202 measures a first current through line conductor 206 (shown in FIG. 2), measures a second current through neutral conductor 210 (shown in FIG. 2), and transmits first and second signals representative of the first and second currents, respectively. In addition, voltage sensor 204 (shown in FIG. 2) measures a voltage across conductors of circuit 208, such as across line conductor 206 and neutral conductor 210. Voltage sensor 204 transmits a third signal representative of the voltage. In an exemplary embodiment, signal conditioning unit 212 (shown in FIG. 2) receives the signals representative of the first current, the second current, and the voltage, and performs one or more of a filtering operation, an amplification operation, and an A/D conversion on the signals. Signal conditioning unit 212 then transmits 304 the signals to processor 220 (shown in FIG. 2).

Processor 220 receives the signals and determines whether an inductive load on circuit 208 should be adjusted and whether a ground fault current is present on circuit 208. Specifically, processor 220 calculates 306 a capacitive leakage current component of the residual current and a ground fault current component of the residual current. For example, as described in greater detail above, processor 220 calculates an imaginary portion of the residual current, which represents the capacitive leakage current component. Moreover, processor 220 calculates a real portion of the residual current, which represents the ground fault current component. Processor 220 compares 308 the capacitive leakage current component to a first threshold value. Based on the comparison, processor 220 determines 310 whether the capacitive leakage current component is greater than the first threshold value. If the capacitive leakage current component is not greater than the first threshold value, processor 220 waits for a next residual current signal to be transmit by signal conditioning unit 212. When the capacitive leakage current component is greater than the threshold value, processor 220 calculates 312 an amount of inductive load to be added to circuit 208 to approximately cancel the capacitive leakage current component. Processor 220 transmits a command signal to selector 216 (shown in FIG. 2) that includes an amount of inductive load to be added to circuit 208 to approximately cancel the capacitive leakage current component. In response to the command signal, selector 216 causes inductive load device 214 (shown in FIG. 2) to adjust the inductive load.

When the capacitive leakage current component has been approximately cancelled or is at least less than the first threshold value, processor 220 transmits a signal representative of the ground fault current component to GFCI 110 (shown in FIG. 2). GFCI 110 compares 314 the ground fault current component to a second threshold to determine 316 whether a ground fault is present on circuit 208. If a ground fault is present, GFCI 110 interrupts 318 current flow through circuit 208.

Exemplary embodiments of systems, methods, and apparatus for detecting a ground fault and/or masking a leakage current are described above in detail. The systems, methods, and apparatus are not limited to the specific embodiments described herein but, rather, operations of the methods and/or components of the systems and/or apparatus may be utilized independently and separately from other operations and/or components described herein. Further, the described operations and/or components may also be defined in, or used in combination with, other systems, methods, and/or apparatus, and are not limited to practice with only the systems, methods, and apparatus as described herein.

Although the present invention is described in connection with an exemplary power distribution system environment, embodiments of the invention are operational with numerous other general purpose or special purpose power distribution system environments or configurations. The power distribution system environment is not intended to suggest any limitation as to the scope of use or functionality of any aspect of the invention. Moreover, the power distribution system environment should not be interpreted as having any dependency or requirement relating to any one or combination of components illustrated in an exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A leakage current masking device for use with a circuit, said leakage current masking device comprising:
    at least one inductive load device coupled to the circuit and configured to provide an inductive load to the circuit; and
    a processor communicatively coupled to said at least one inductive load device, said processor configured to:
        receive a signal representative of a current through the circuit;
        calculate an imaginary portion of a residual current through the circuit based at least in part on the signal representative of the current through the circuit, the imaginary portion of the current representing a capacitive leakage current; and
        cause said at least one inductive load device to adjust the inductive load provided to the circuit based at least in part on the calculated imaginary portion of the residual current.

2. A leakage current masking device in accordance with claim 1, further comprising a current sensor communicatively coupled to said processor, said current sensor configured to measure the current through the circuit and transmit the signal representative of the current to said processor.

3. A leakage current masking device in accordance with claim 2, wherein the circuit includes at least one line conductor and a neutral conductor, said current sensor is further configured to measure a first current through the at least one line conductor, measure a second current through the neutral conductor, transmit a first signal representative of the first current to said processor, and transmit a second signal representative of the second current to said processor, and wherein said processor is further configured to calculate the residual current through the circuit as a sum of the first current and the second current.

4. A leakage current masking device in accordance with claim 2, further comprising a signal processing unit communicatively coupled to said current sensor and said processor, said signal processing unit is configured to receive the signal representative of the current through the circuit from said current sensor and to apply at least one of a filtering operation and an analog-to-digital conversion operation to the signal.

5. A leakage current masking device in accordance with claim 1, wherein said processor is further configured to compare the calculated imaginary portion of the residual current to a threshold value.

6. A leakage current masking device in accordance with claim 5, wherein said processor is further configured to cause said at least one inductive load device to increase the inductive load on the circuit when the calculated imaginary portion of the residual current is greater than the threshold value.

7. A leakage current masking device in accordance with claim 1, further comprising a selector communicatively coupled to said processor and said at least one inductive load device, said processor is further configured to transmit a command signal to said selector, wherein said selector is configured to cause said at least one inductive load device to adjust the inductive load supplied to the circuit in response to the command signal.

8. A charging system comprising:
    a ground fault circuit interrupter (GFCI) configured to detect a ground fault in a circuit that couples a source to a load; and
    a leakage current masking device electrically coupled to said GFCI, said leakage current masking device comprising:
        at least one inductive load device coupled to the circuit and configured to supply an inductive load to the circuit; and
        a processor communicatively coupled to said at least one inductive load device, said processor configured to:
            receive a signal representative of a current through the circuit;
            calculate an imaginary portion of a residual current through the circuit based at least in part on the signal representative of the current through the circuit, the imaginary portion of the current representing a capacitive leakage current; and
            cause said at least one inductive load device to adjust the inductive load supplied to the circuit based at least in part on the calculated imaginary portion of the residual current.

9. A charging system in accordance with claim 8, wherein said leakage current masking device further comprises a current sensor communicatively coupled to said processor, said current sensor is configured to measure the current through the circuit and transmit the signal representative of the current to said processor.

10. A charging system in accordance with claim 9, wherein the circuit includes at least one line conductor and a neutral conductor, said current sensor is further configured to measure a first current through the at least one line conductor, measure a second current through the neutral conductor, transmit a first signal representative of the first current to said processor, and transmit a second signal representative of the second current to said processor, and wherein said processor is configured to calculate the residual current through the circuit by summing the first current and the second current.

11. A charging system in accordance with claim 8, wherein said processor is further configured to compare the calculated imaginary portion of the residual current to a threshold value.

12. A charging system in accordance with claim 11, wherein said processor is further configured to cause said at least one inductive load device to increase the inductive load on the circuit when the calculated imaginary portion of the residual current is greater than the threshold value.

13. A charging system in accordance with claim 9, wherein said leakage current masking device further comprises a selector communicatively coupled to said processor and said at least one inductive load device, said processor is further configured to transmit a command signal to said selector, and said selector configured to cause said at least one inductive load device to adjust the inductive load supplied to the circuit in response to the command signal.

14. A method for detecting a resistive ground fault in a circuit, said method comprising:
- receiving at a processor a signal representative of a current through the circuit;
- calculating, by the processor, an imaginary portion of a residual current through the circuit and a real portion of the residual current based at least in part on the signal representative of the current through the circuit;
- causing, by the processor, at least one inductive load device to adjust an inductive load supplied to the circuit based at least in part on the calculated imaginary portion of the residual current; and
- detecting a resistive ground fault in the circuit based on the calculated real portion of the residual current.

15. A method in accordance with claim 14, further comprising applying at least one of a filtering operation and an analog-to-digital conversion operation to the signal representative of the current.

16. A method in accordance with claim 14, wherein causing at least one inductive load device to adjust an inductive load comprises comparing the imaginary portion of the residual current to a first threshold value and causing the at least one inductive load device to increase the inductive load on the circuit when the imaginary portion of the residual current is greater than or equal to the first threshold value.

17. A method in accordance with claim 16, wherein detecting a resistive ground fault comprises comparing the calculated real portion of the residual current to a second threshold value.

18. A leakage current masking device in accordance with claim 2, wherein the circuit includes a first conductor and a second conductor, said current sensor is configured to measure a difference between a first current through the first conductor and a second current through the second conductor, and to transmit the measured difference to said processor as the signal representative of the current through the circuit.

19. A charging system in accordance with claim 9, wherein the circuit includes a first conductor and a second conductor, said current sensor is configured to measure a difference between a first current through the first conductor and a second current through the second conductor, and to transmit the measured difference to said processor as the signal representative of the current through the circuit.

20. A charging system in accordance with claim 8, wherein said processor is further configured to calculate a real portion of the residual current through the circuit and transmit a signal representative of the real portion of the residual current, and wherein said GFCI is configured to determine is a ground fault condition exists based on the signal representative of the real portion of the residual current.

* * * * *